United States Patent [19]

Foley et al.

[11] 4,353,882

[45] Oct. 12, 1982

[54] PURIFICATION OF ALUMINUM CHLORIDE

[75] Inventors: Ernest Foley, East Burwood; Lionel J. Rogers, Rockbank; Henry J. Gardner, East Ringwood; Louis J. Wibberley, Newcastle, all of Australia

[73] Assignee: Commonwealth Scientific and Industrial Research Organization, Campbell, Australia

[21] Appl. No.: 193,493

[22] Filed: Oct. 3, 1980

[30] Foreign Application Priority Data

Oct. 3, 1979 [AU] Australia ............................. PE0760

[51] Int. Cl.$^3$ .......................... C01F 7/62; C01G 49/10
[52] U.S. Cl. .................................... 423/111; 423/138
[58] Field of Search ............... 423/111, 135, 136, 138, 423/140, 141, 493, 495; 203/32, 73, 80, 88, 47, 48, 71

[56] References Cited

U.S. PATENT DOCUMENTS 2,387,228 10/1945 Arnold ................................ 423/135
2,816,814 12/1957 Plucknett ............................ 203/71
3,938,969 1/1976 Sebenik et al. ..................... 423/495

OTHER PUBLICATIONS

S. Danov et al., *Purification of Industrial Aluminum Chloride by Rectification on a Pilot Rectifying Column*, USSR *Trudy Po Nhimii I Khimicheskoi Tekhhologii*, 1961, 4:727-430.

*Primary Examiner*—O. R. Vertiz
*Assistant Examiner*—Margaret B. Medley
*Attorney, Agent, or Firm*—Sughrue, Mion, Zinn, Macpeak & Seas

[57] ABSTRACT

A method for the recovery of anhydrous aluminium chloride from a mixture of the aluminium chloride with ferrous chloride or ferric chloride, or both, which comprises subjecting the liquid mixture to a reduction in pressure, the conditions being such as to bring about dissociation of compounds of aluminium chloride and ferrous chloride present in the mixture, thereby to form an aluminium chloride-rich vapour and an iron chloride-rich solid and then separately collecting of the iron-and aluminium-rich components under conditions which give the minimum opportunity for recombination.

12 Claims, 1 Drawing Figure

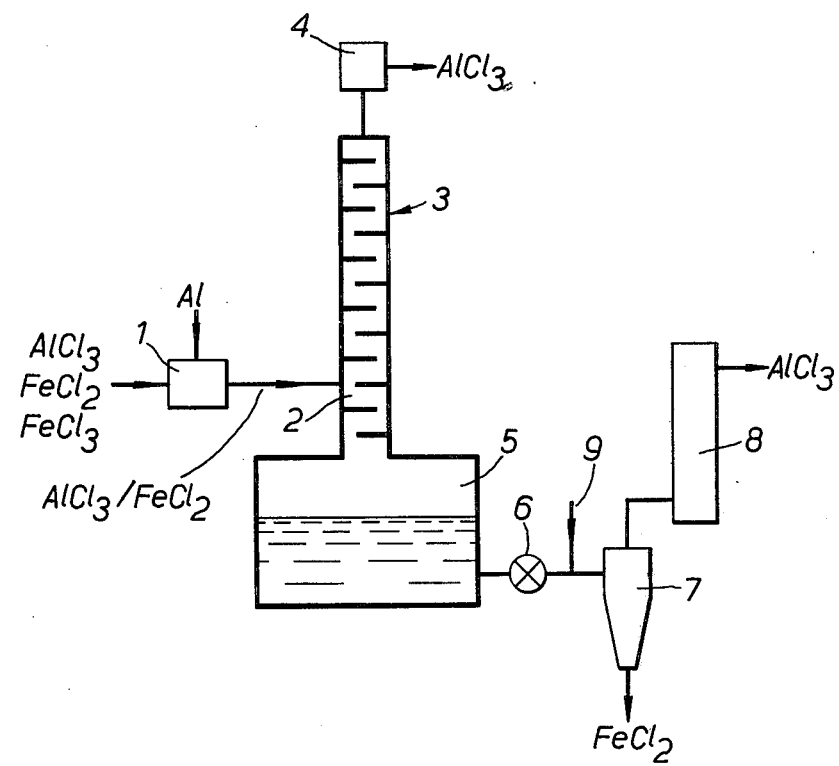

PURIFICATION OF ALUMINUM CHLORIDE

This invention is concerned with processes for the recovery of anhydrous aluminium chloride ($AlCl_3$) values from impure anhydrous aluminium chloride containing either ferrous chloride ($FeCl_2$) or ferric chloride ($FeCl_3$) or both. Such impure material may be produced, for instance, by the chlorination of natural ores such as bauxites or beneficiated materials such as Bayer-type alumina.

Recently, factors such as the necessity for energy conservation, and the desirability of reducing electrode consumption and environmental pollution have led to considerable work being carried out on alternatives to the Hall-Heroult electrolytic method for the production of aluminium metal. One such alternative method currently receiving much attention involves the electrolysis of chloride melts containing anhydrous $AlCl_3$. Because of the high electropositive and solvent character of aluminium, it is essential that the $AlCl_3$ which is fed progressively to the electrolysis cells contains no more than trace proportions of impurities, except for compatible salts of more electropositive metals such as the alkali or alkaline earth metals. For smooth cell operation and acceptably along cell life, the near complete absence of oxidation or hydrolysis products of $AlCl_3$ is also necessary.

When prepared from natural or beneficiated aluminous materials by chlorination, $AlCl_3$ is invariably contaminated by significant proportions of chlorides of iron, titanium and silicon. Whilst titanium and silicon chlorides are readily removed, complete elimination of iron chlorides is difficult due to their interaction with $AlCl_3$ to produce such compounds as $FeAlCl_6$ and $Fe(AlCl_4)_2$.

Although a proportion of the aluminium chloride can be recovered in a purified form by fractional distillation under pressure, accumulation of iron chlorides in the boiler of the distillation unit requires progressively increasing temperatures to maintain distillation of $AlCl_3$ and, ultimately, closing down of the unit to remove the residue. The significant proportions of $AlCl_3$ which remain in the residues must then be discarded, or reused after removal of iron.

It is a principal object of the present invention to provide a purification method which overcomes these problems and is capable of recovering high-quality $AlCl_3$ at high efficiency from admixtures with $FeCl_3$ and $FeCl_2$ or both.

More specifically, where distillation under pressure is being used to prepare $AlCl_3$, the invention seeks to provide a method which permits distillation to be carried out in a continuous manner, by allowing continuous removal of iron chloride from the pressurised system.

According to the present invention there is provided a method for the recovery of anhydrous aluminium chloride from a mixture of the aluminium chloride with ferrous chloride or ferric chloride, or both, which comprises conversion of ferric chloride to ferrous chloride, subjecting the liquid mixture to a reduction in pressure, the conditions being such as to bring about dissociation of compounds of aluminium chloride and ferrous chloride present in the mixture, thereby to form an aluminium chloride-rich vapour and an iron chloride-rich solid and then separately collecting of the iron- and aluminium-rich components of the vapour under conditions which give the minimum opportunity for recombination.

The method of the invention is effective whether the initial contaminant (in, for example, the feed to the distillation unit) is $FeCl_3$ or $FeCl_2$ for we have observed that when distilling from an $AlCl_3$ melt containing $FeCl_3$, conversion of $FeCl_3$ into $FeCl_2$ and chlorine ($Cl_2$) occurs in the fractionating column, so that it is $FeCl_2$ rather than $FeCl_3$ which accumulates in the still "bottoms". However, when the $AlCl_2$ feed material contains $FeCl_3$ it is reduced to the ferrous state e.g., by aluminium, iron (or $H_2$) prior to further treatment in order to minimise corrosion problems, e.g., in the distillation unit and to avoid diluting the $AlCl_3$ vapour with chlorine.

The principle of the method disclosed herein is thus to effect the dissociation of $AlCl_3$-$FeCl_2$ compounds and to collect the components separately while allowing the minimum opportunity for recombination. In one practical embodiment, the method of the invention involves melting under pressure the $AlCl_3$-$FeCl_2$ mixture, if not already in the molten state, to give a homogeneous liquid. The liquid is then allowed to flow, in a controlled manner, through an expansion valve into a heated region of lower pressure, usually atmospheric pressure. Under these conditions rapid dissociation of $AlCl_3$-$FeCl_2$ compounds occurs, the temperature of the heated region being sufficiently high to prevent condensation of $AlCl_3$ but low enough to ensure complete retention of the relatively involatile $FeCl_2$-rich material. The latter material may then be removed by any suitable means, e.g., a heated cyclone. The uncondensed $AlCl_3$-rich vapour fraction passes into a total condenser, e.g., a fluid bed condenser operating at about 70° C.

The method of the invention can conveniently be operated in conjunction with a distillation unit by providing a suitable expansion valve at or near the base of the boiler of the unit. The liquid mixture can then be continuously, or intermittently, drawn off through the valve to provide separation and recovery of the aluminium chloride in accordance with the invention.

It will be appreciated that, since the $AlCl_3$-$FeCl_2$ mixture is completely liquid, neither $FeCl_2$ nor $AlCl_3$ accumulates in the pressurised part of the system. Where the $FeCl_2$-$AlCl_3$ mixture referred to is collecting in the boiler section of a continuously-operating distillation unit, we find it convenient to limit the $FeCl_2$ proportion to a maximum of 20 mol percent in order to ensure that no solid phase deposits when operating the distillation unit at the moderate pressures and temperatures normally required. However, where the apparatus allows the use of operating pressures and temperatures which are sufficiently high to ensure that the $AlCl_3$-$FeCl_2$ mixture remains liquid and that no solid phases are formed, the $FeCl_2$ contents higher than 20%, as high as 45%, may be tolerated.

The conditions of temperature and pressure under which the $AlCl_3$-$FeCl_2$ mixture is melted will vary with the $FeCl_2$ content. At about 20% $FeCl_2$ the temperature range of the boiling solution may extend from about 230° C. to 350° C., the operating pressure within the system being controlled by the reflux conditions, typically to between 2.5 and 3.5 atmospheres (abs.).

It will be understood that the method is applicable to mixtures of anhydrous $AlCl_3$ and iron chlorides however produced.

The invention is further described and illustrated by reference to the accompanying drawing which shows diagrammatically a distillation unit for the purification of aluminium chloride.

Crude liquid aluminium chloride (containing iron chlorides) entering the apparatus first passes through a reactor 1 where it is reduced with aluminium to convert all iron chlorides to the ferrous states. The liquid mixture is then fed into the lower section 2 of the reflux column 3 of the distillation unit. Pure liquid $AlCl_3$ flows from the reflux head 4 and a liquid mixture of $FeCl_2$-enriched $AlCl_3$ collects in the boiler section 5.

The unit is operated under conditions such that the $FeCl_2$ content of liquid mixture in the boiler 5 is as high as practicable while avoiding deposition of any solid material in the boiler.

In accordance with the teachings of the present invention, the boiler 5 is provided with an expansion valve 6 near its base. The outlet of valve 6 is connected to a heated cyclone separator 7, the overflow outlet of which is connected to a total condenser 8.

When valve 6 is opened, the liquid mixture which is under pressure in the boiler 5 flows out of the boiler and into the region of lower pressure in the cyclone 7, where the mixture dissociates yielding solid particles of $FeCl_2$ and $AlCl_3$ vapour. The $FeCl_2$ particles are collected in the hot cyclone 7 and pass out the underflow. The $AlCl_3$ vapour passes to the condenser 8 where it solidifies and is subsequently collected.

If necessary an inert carrier gas may be injected at point 9 in the line between the valve 6 and cyclone 7 to reduce back diffusion effects.

The operation of the method of the invention is demonstrated by the following examples.

EXAMPLE 1

A mixture of $AlCl_3$ and $FeCl_2$ (20 mol % $FeCl_2$) was melted at 250° C. under pressure in a sealed glass container fitted with a needle-valve near its lowest point. When equilibrium was attained, the needle-valve was opened slightly and about 75% of the molten mixture allowed to expand to atmospheric pressure at a controlled rate into a glass tube maintained at about 250° C. A $FeCl_2$-enriched solid phase deposited in the tube. The uncondensed gas passed into a total condenser from which an $AlCl_3$-enriched solid phase was collected. The results, see Table 1, show that 83.5% of the $AlCl_3$ contained in the mixture was recovered as a solid containing only about 0.4 mol % (0.38% wt) of $FeCl_2$. The $FeCl_2$-enriched phase contained over 98% of the $FeCl_2$ present in the original mixture.

EXAMPLE 2

Experimental details were as in Example 1 except that the mixture of $AlCl_3$ and $FeCl_2$ (20 mol % $FeCl_2$) was heated to 350° C. under pressure in a steel container fitted with a needle valve at its lowest point.

The results, see Table 1, show that 96.3% of the $AlCl_3$ contained in the mixture was recovered as a solid containing 0.4 mol % $FeCl_2$ and that the $FeCl_2$ phase contained over 98% of the $FeCl_2$ contained in the original mixture.

TABLE 1

| Example | Composition (mol % $FeCl_2$) | | | Recovery %* | |
|---|---|---|---|---|---|
| | Original Mixture | $FeCl_2$—rich phase | $AlCl_3$—rich phase | $AlCl_3$ | $FeCl_2$ |
| 1 | 20 | 60 | 0.4 | 83.5 | 98.6 |
| 2 | 20 | 87 | 0.4 | 96.3 | 98.5 |

*in $AlCl_3$—rich and $FeCl_2$—rich fraction respectively

We claim:

1. A method for the recovery of anhydrous aluminium chloride from a mixture of aluminium chloride with ferrous chloride which is essentially free of ferric chloride, which comprises subjecting a liquid mixture of said aluminium chloride with ferrous chloride to a reduction in pressure, the conditions being such as to bring about dissociation of compounds formed between aluminium chloride and ferrous chloride present in the mixture, thereby to form an aluminium chloride-rich vapour and an iron chloride-rich solid and then separating collecting the iron- and aluminium-rich components at conditions under which the extent of reformation of compounds between aluminium chloride and ferrous chloride is minimized.

2. A method as claimed in claim 1, wherein the reduction of pressure is brought about by allowing the liquid mixture of chlorides to flow under pressure through an expansion valve into a region of lower pressure, said lower pressure region being at a temperature which is sufficiently high to ensure that condensation of aluminium chloride does not occur but sufficiently low to allow relatively involatile ferrous chloride-rich material to deposit.

3. A method as claimed in claim 2, wherein the aluminium chloride-rich vapour is separately condensed after separation of the ferrous chloride-rich material.

4. A method as claimed in claims 2 or 3 wherein, the temperature of the liquid mixture prior to pressure reduction is from about 230° to about 350° C.

5. A method as claimed in claim 4, wherein the temperature is from about 230° to about 250° C.

6. A method as claimed in claims 1, 2 or 3 wherein the liquid mixture contains up to 20 mol. percent of ferrous chloride.

7. In a method for the purification of aluminium chloride wherein impure aluminium chloride containing ferrous and/or ferric chlorides is fractionally distilled under pressure and wherein a relatively involatile liquid mixture of aluminium and ferrous chloride, together with residual ferric chloride, accumulates in the boiler of the distillation apparatus, the improvement which comprises providing an expansion valve in or near the base of said boiler and, after conversion of any ferric chloride in the liquid mixture to ferrous chloride, intermittently or continuously allowing the liquid mixture essentially free of ferric chloride to flow under pressure through the expansion valve out of the boiler into a region of lower pressure, the conditions created being such as to bring about dissociation of the compounds formed between aluminium chloride and ferrous chloride present in the mixture thereby to form an aluminium chloride-rich vapour and an iron chloride-rich solid, and then separately collecting the iron- and aluminium-rich components at conditions under which the extent of reformation of compounds between aluminium chloride and ferrous chloride is minimized.

8. A method as claimed in claim 1, wherein the temperature of the liquid mixture prior to pressure reduction is from about 230° to about 350° C.

9. A method as claimed in claim 8, wherein the temperature is from about 230° to about 250° C.

10. A method as claimed in claim 1, wherein the liquid mixture contains up to 20 mol % of ferrous chloride.

11. A method as claimed in claim 4, wherein the liquid mixture contains up to 20 mol % of ferrous chloride.

12. A method as claimed in claim 5, wherein the liquid mixture contains up to 20 mol % of ferrous chloride.

* * * * *